Inventors:
David B. Baker
and William O. Bechman.
By Paul O. Pippel
Atty.

Patented Apr. 9, 1946

2,397,910

UNITED STATES PATENT OFFICE 2,397,910

TRACTOR FRAME AND DRIVE SHAFT BEARING STRUCTURE THEREIN

David B. Baker, Riverside, and William O. Bechman, Chicago, Ill., assignors to International Harvester Company, a corporation of New Jersey Application June 26, 1944, Serial No. 542,145

3 Claims. (Cl. 74—606)

This invention has to do with a tractor frame and relates more particularly to a fabricated housing portion thereof and the alinement of bearings therein for shafting which transmits driving force to the driver wheels of the tractor.

The invention is particularly applicable to the frames of crawler tractors. These frames, because of their weight, size and irregular contour, have been fabricated from a plurality of parts instead of being formed in a single piece. These parts of the frame support contain bearings for the shafting which transmits driving force from the engine to the traction assemblies or endless tracks. Heretofore it has been difficult to control the assembly operations and proper care on the part of the workmen to insure that certain bearings in separate of the interconnected frame portions shall be properly alined.

The general object of this invention is the provision of an improved fabricated tractor frame structure which employs portions of separate bearing members for alining the frame portions so that the bearings themselves will be precisely alined in the completely assembled frame.

Figure 1:
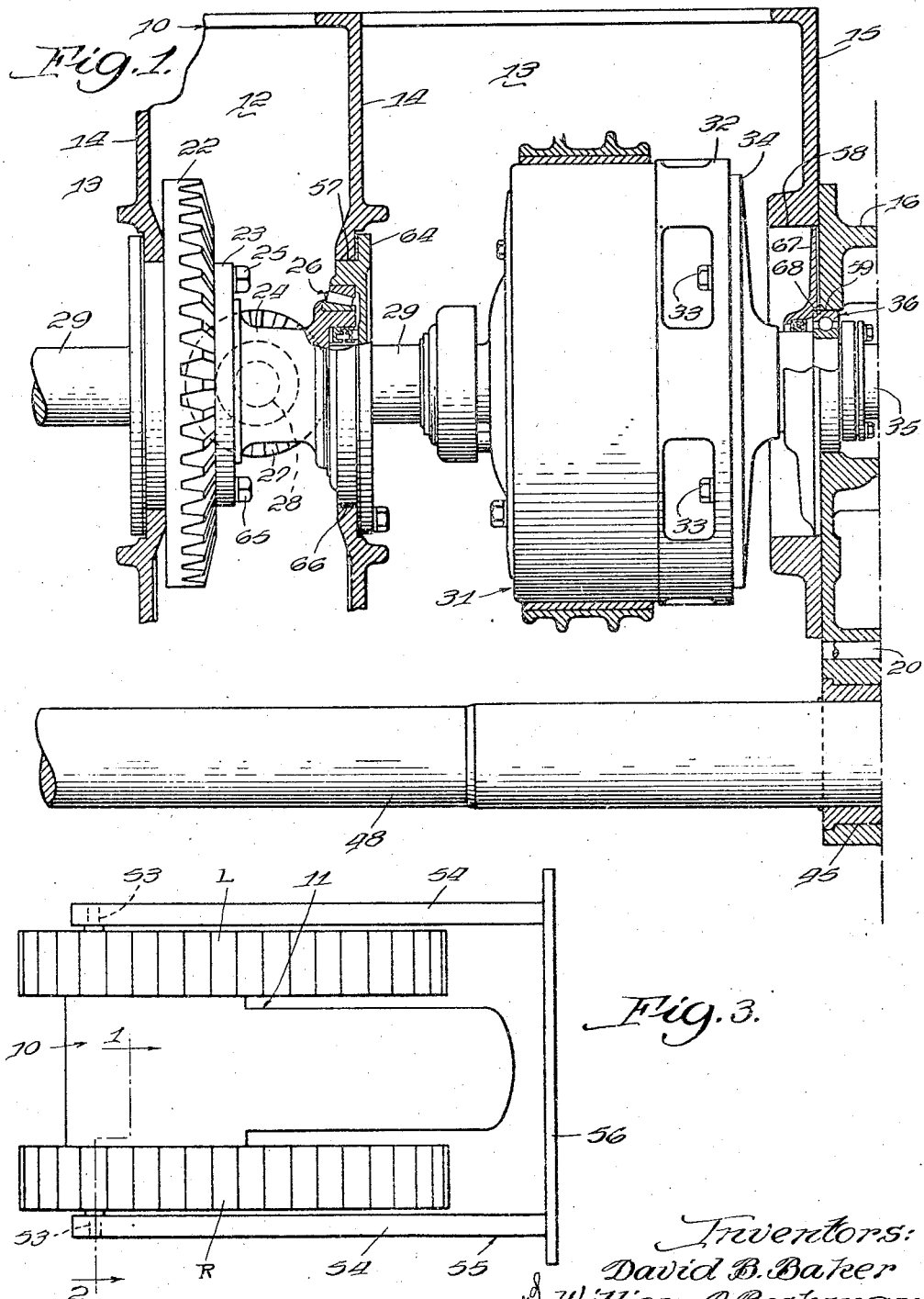
Figure 2:
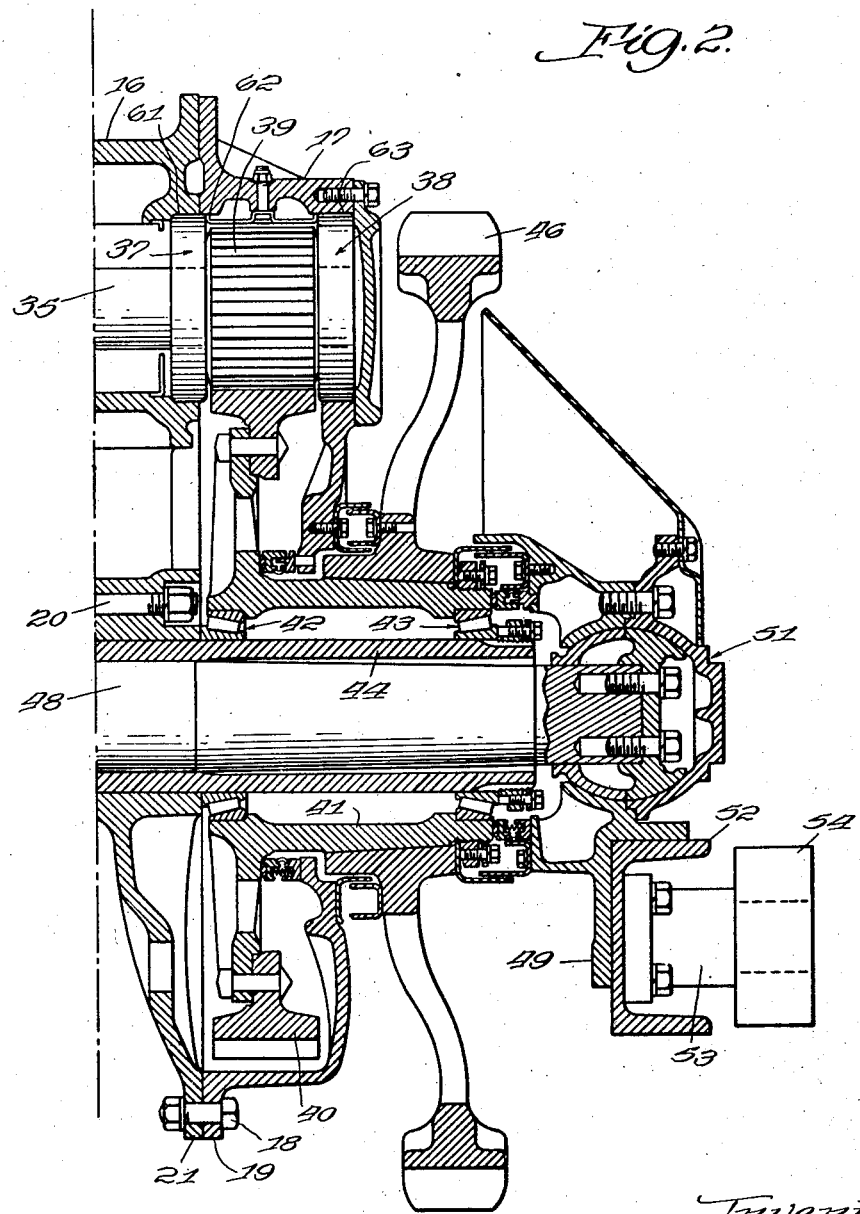

More specific and ancillary objects will become apparent and the foregoing object will be better understood upon reading the following description with reference to the two sheets of drawings annexed hereto, and wherein:

Figs. 1 and 2 are complementary views which, when assembled along the dot-dash lines at their edges, form a composite view taken on a vertical plane transversely through a rear frame portion of a crawler tractor and illustrating a preferred form of the invention. This composite view of Figs. 1 and 2 is taken substantially upon the line 1—2 of Fig. 3; and Fig. 3 is a diagrammatic plan view of a crawler tractor of which the apparatus illustrated in Figs. 1 and 2 forms a part.

To more clearly illustrate the invention, there are illustrated herein environment parts not herein claimed but shown and claimed in concurrently filed applications Serial No. 542,142, filed June 26, 1944, to William O. Bechman et al.; Serial No. 542,143, filed June 26, 1944, to Russel D. Acton; and Serial No. 542,146, filed June 26, 1944, to David B. Baker et al., to which reference is invited.

With continued reference to the drawings, a center rear portion 10 of the tractor frame 11 will be seen to have a center gear compartment 12 flanked on either side by clutch compartments 13. Compartment walls 14 at the inner sides of the clutch compartments 13 separate these compartments from said gear compartment. To the outer wall 15 of each clutch compartment (one being shown) there is attached a spacing member 16 by means of bolts 20, of which one only is shown in Figs. 1 and 2. A cover member 17 is secured to the outer end of the spacing member 16 by cap screws 18 distributed circumferentially about flanges 19 and 21 respectively upon the inner end of said cover member and the outer end of the spacer member. Thus the parts 10, 16, and 17 are fabricated into a rigid assembly.

The gear compartment 12 contains a bevelled ring gear 22, which is secured to a flange 23 upon a tubular member 24 by bolts 25. This tubular member is rotatably supported by roller bearing units 26 (one being shown) in the compartment walls 14. Driving force for the gear 22 is received from a pinion 27 meshed therewith and formed integrally with a tail shaft 28 extending from a change-speed transmission gearing just forwardly of the compartment 12.

There are identical arrangements of driving structure on each side of the gear compartment 12, and each of these structures is driven by a shaft 29, one of which projects to the left from an internally splined connection (not shown) with the tubular driving member 24, and the other of said shafts projects to the right from a similar connection with said tubular member. Since the arrangements on the two sides of the gear compartment 12 are identical, only that to the right of the compartment will be hereinafter referred to. The right end of the rightmost shaft 29 is secured to the driving part of a clutch 31. The details of this clutch, which is a multiple plate friction clutch, are fully described in cofiled application Serial No. 542,143, filed June 26, 1944, as well as the connection of the shaft 29 thereto. The driven part 32 of said clutch is connected by cap screws 33 to a flange 34 on a clutch-driven shaft 35 which extends into the compartment formed by the spacer member 16 and the cover member 17. Shaft 35 is carried at its left end upon the inner race of a ball-bearing unit 36, whereas a mid-section of said shaft is carried on the inner race of a ball-bearing unit 37, and the right end of said shaft is carried by the inner race of a ball-bearing unit 38. When the clutch 31 is engaged, power will be transmitted from the shaft 29 to the shaft 35 thence through a gear 39, splined to the shaft 35, to a large gear 40 of which the hub 41 is carried upon roller-bearing units 42 and 43 of which the inner races are fixed upon a tubular spar 44 having its left end anchored in an opening 45 in the spacing member 16. The hub 41 of the gear 40 has the hub of a track driving sprocket 46 fixed non-rotatively thereon so that when the clutch 31 is closed and the shaft 29 rotated, the sprocket 46 will be driven at a reduced speed through the gears 39 and 40. This sprocket 46 has a driving connection with the endless track R at its side of the tractor (see Fig. 3). A sprocket corresponding to the sprocket 46 but not shown is at the opposite side of the tractor for driving the endless track L.

A transverse pivot shaft rod 48 extends transversely across the tractor frame and through the tubular spar members 44 for the attachment of force-transmitting studs 49 to their ends at the sides of the tractor. A universal knuckle joint 51 establishes the connection between the ends of the transverse rod 48 and the side frame members. These studs 49 have fore and aft extending channels 52 depending therefrom, and, in the present instance, these channels provide an anchorage for bearing members 53 which pivotally support the back ends of thrust beams 54 of a bull-dozer implement 55 having a blade 56 disposed forwardly of the tractor. Since the transverse rod 48 is fully described and claimed in the aforesaid filed application Serial No. 542,146, filed June 26, 1944, no further reference thereto is herein made other than to explain that this rod serves to absorb at its ends backward thrust applied to the bearing members 53 through the thrust beams 54 of the bull-dozer implement.

The present invention relates to the expedient herein employed of utilizing the outer races of the ball-bearing units 36, 37, and 38 in accurately alining the housing portions 15, 16, and 17 so that these bearing units will be truly coaxial with one another and with the ball-bearing units 26 in the inner compartment walls 14.

In the preparation of the rightmost compartment 13, for example, the walls 14 and 15 are drilled with coaxial openings 57 and 58, the opening 58 being at least as large in diameter as the opening 57 and preferably larger so that access through the opening 58 can be had for reaming or otherwise forming the opening 57 precisely coaxially with the opening 58 with the same centered setting of the boring or reaming tool. Likewise, a common centering setting upon the operating machine can be employed in the forming of the opening 59 in the left end of the spacing member 16 and the bearing unit seat 61 in the outer end of this member 16. The same principle is used in the formation of the opening 62 in the left end of the cover member 17 and the opening 63 in the right end of this member. Thus the pair of openings 57 and 58 are expediently formed truly coaxial as are the opening 59 and the bearing unit seat 61 and the openings 62 and 63. A bearing supporting plate 64 is mounted in the compartment wall 14 where it is retained by cap screws 65. By making the circular periphery 66 of the plate 64 of the same diameter as the opening 57 in the wall 14, this convenient method is used in centering the roller bearing unit 26 with respect to the opening 57, and since these bearing units are made extremely accurately, the driving tubular member 24 journaled in the roller bearing unit 26 will be accurately centered. An accurately centered support for the shafts 29 is thereby established. In the outer wall 15 of the clutch compartment, a second bearing supporting plate 67 is fitted into the opening 58 to thereby center a bearing unit seat 68 with respect to the opening 58. This seat 68 is made of the same diameter as the opening 59 in the left end of the spacer member 61, and the diameter of the outer periphery of the ball-bearing unit 36 is such that it can be pressed firmly into the opening 59 and into the seat 68 for accurately establishing the coaxial relation of said seat and said opening with the opening 58 and hence with the opening 57 in the inner wall 14.

In a similar fashion, the openings 61 and 62 in the frame housing members 16 and 17 which are of identical diameter are capable of a press fitting relation with the outer race of the bearing unit 37 to thereby aline this unit with the bearing units 26, 36, and 38. In effect, the outer races of the bearing units 36 and 37 serve the double function of bearing races and of dowel pins and establish the exact desired alinement of the frame parts 10, 16, and 17 at the critical zone in which the bearings are placed. Subsequent to the cooperative functioning of the outer races of the bearing units 36 and 37 and of the frame housing portions 10, 16, and 17 in establishing the exact alinement of said bearing units with the bearing units 26 and 38, the bolts 20 and 18 are tightened to maintain the assembly.

Having thus described a preferred embodiment with the view of illustrating the invention, we claim:

1. In a tractor drive structure; a tractor frame housing including a multi-compartment casting having integral inner and outer walls, a clutch compartment between said walls, a driving gear compartment separated from the clutch compartment by said inner wall, shaft bearing openings formed coaxially in said walls, a shaft bearing unit in the inner wall opening, a separate compartment casting secured onto the outer side of the outer wall and having axially spaced coaxial shaft bearing openings respectively adjacently to and remote from the outer wall opening and formed within integral walls of such casting, a shaft bearing unit in said remote opening, and a shaft bearing unit mutually in said outer wall opening and the opening adjacent thereto to insure axial alinement of all of said bearing units.

2. In a tractor drive structure; a tractor frame housing including a multi-compartment casting having inner and outer walls, a clutch compartment between said walls, a driving gear compartment separated from the clutch compartment by said inner wall, shaft bearing openings formed coaxially in said walls, a spacer member having integral inner and outer end portions and secured onto the outer side of the outer clutch compartment wall with the inner end portion adjacent thereto, said spacer member having axially alined shaft bearing seats in its end portions, a cover member having integral inner and outer end portions and secured in end to end relation with the spacer member and with the inner end portion of the cover member contiguously to the outer end portion of said spacer member, said cover member having axially alined shaft bearing seats in its end portions, shaft bearing units in said inner wall opening and in the outer end seat of the cover member, and additional shaft bearing units disposed respectively mutually in said outer wall opening and the inner end seat of the spacer member and mutually in the outer end seat of the spacer member and the inner end seat of the cover member to insure axial alinement of all of said bearing units.

3. In a tractor drive structure, a frame housing structure having a shaft bearing seat in a side thereof and a shaft bearing coaxial with and spaced axially inwardly of the housing from said seat, a housing cover member having inner and outer integral end portions and secured to said housing structure with the inner end portion contiguously to said side of the housing structure, said cover member having a shaft bearing seat in its inner end portion and an axially alined shaft bearing in its outer end portion, and a bearing disposed mutually in said seats to establish a coaxial relation of all of said bearings.

DAVID B. BAKER.
WILLIAM O. BECHMAN.